United States Patent [19]

Johnson et al.

[11] Patent Number: 4,540,225

[45] Date of Patent: Sep. 10, 1985

[54] SWIVEL CABLE COUPLING FOR AN AIR CARBON-ARC CUTTING AND GOUGING TORCH

[75] Inventors: David E. Johnson, Pataskala; Kenneth E. McCall, Lancaster, both of Ohio

[73] Assignee: Arcair Company, Lancaster, Ohio

[21] Appl. No.: 529,916

[22] Filed: Sep. 7, 1983

[51] Int. Cl.³ ............................................. H01R 35/00
[52] U.S. Cl. .............................. 339/16 RC; 285/174; 339/8 R
[58] Field of Search ................... 339/8 R, 15–16; 285/174, 252, 239

[56] References Cited

U.S. PATENT DOCUMENTS

| | | | |
|---|---|---|---|
| 2,345,019 | 3/1944 | Van Alstyne | 174/21 |
| 2,395,899 | 3/1946 | Morrow et al. | 174/21 |
| 2,414,957 | 1/1947 | Larrabare | 173/324 |
| 2,422,961 | 6/1947 | Hallstrand | 173/324 |
| 2,428,541 | 10/1947 | Bagley | 250/27 |
| 2,449,138 | 9/1948 | Phillips | 173/324 |
| 2,519,933 | 8/1950 | Rouault | 174/21 |
| 3,234,317 | 2/1966 | Henderson | 174/15 |
| 3,336,559 | 8/1967 | Laubi | 339/8 |
| 3,402,381 | 9/1968 | Gaw et al. | 339/94 |
| 3,573,419 | 4/1971 | Henderson | 219/70 |
| 4,049,943 | 9/1977 | Pratt | 219/74 |
| 4,052,116 | 10/1977 | Sanders et al. | 339/8 R |
| 4,288,110 | 9/1981 | Grenell | 285/174 |

Primary Examiner—Eugene F. Desmond
Attorney, Agent, or Firm—James C. Simmons; E. Eugene Innis

[57] ABSTRACT

A swivel coupling of the type for mounting a concentric cable consisting of an electrical conductor inside of an insulated conduit to an apparatus such as an air carbon-arc cutting and gouging torch wherein a connector used to mount the cable to the torch holds a retainer which can swivel 360° relative to the connector, the retainer in turn holds a cable coupling which is adjusted to hold the conductor and the conduit, the conduit positioned to cooperate with a spring and washer to provide intimate contact between internal electrically conductive parts of the coupling.

10 Claims, 3 Drawing Figures

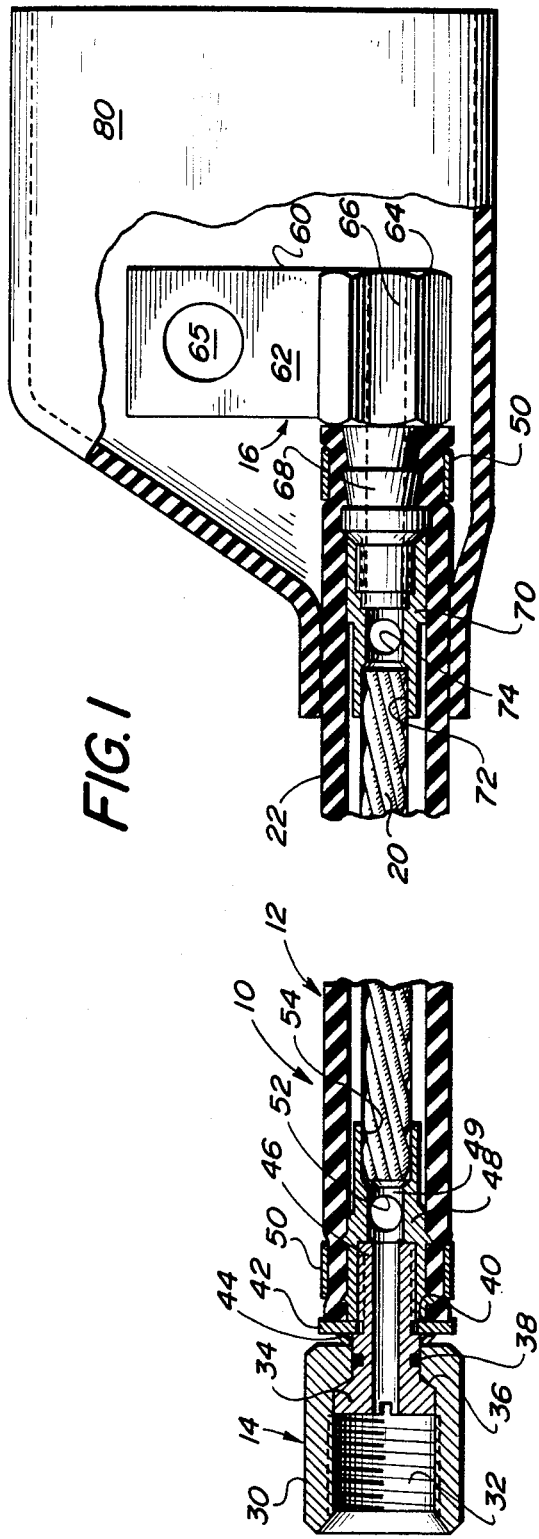
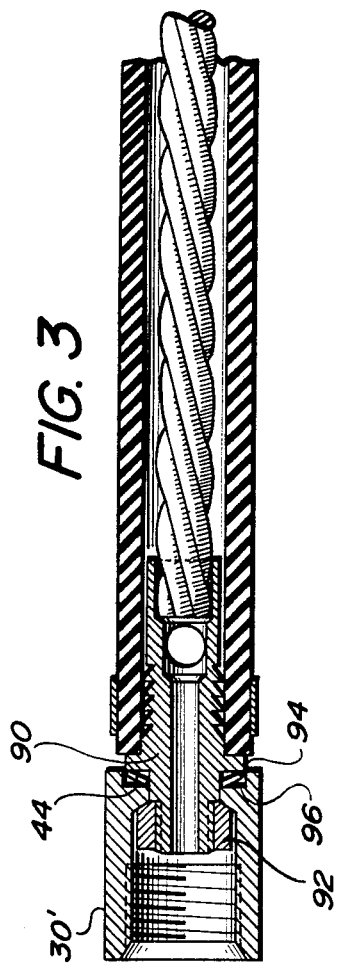
FIG. 1
FIG. 3

SWIVEL CABLE COUPLING FOR AN AIR CARBON-ARC CUTTING AND GOUGING TORCH

TECHNICAL FIELD

This invention pertains to electrical conductors disposed concentrically within an insulating covering or conduit used to deliver electrical current to a tool such as a hand operated air carbon-arc cutting and gouging torch. Because of the nature of the tool it must be manipulated relative to the position of the cable thus requiring the cable to swivel in relation to the torch or the torch to swivel in relation to the cable.

BACKGROUND OF INVENTION

With the advent of the Air Carbon-Arc Cutting and Gouging Process, it became quickly apparent that when the torch such as disclosed in U.S. Pat. No. 3,573,419 was used by an operator and the torch was manipulated, the concentric cable conducting both electricity through a solid conductor disposed within and spaced apart from an insulated conduit utilized to carry air to the torch was in use and the operator twisted the torch and cable to gain a better position relative to his workpiece, it was possible for the braided conduit to unlay thus causing internal arcing and early destruction of the cable and the torch as well as creating an unsafe operating condition.

One solution to this problem is disclosed and claimed in U.S. Pat. No. 3,234,317 wherein the swivel cable is limited to approximated 340° rotation so that the cable will not unlay. The device of the U.S. Pat. No. 3,234,317 is the current state of the art in concentric cables for the Air Carbon-Arc Cutting and Gouging Process.

As another solution Patentees of U.S. Pat. No. 4,052,116 disclose and claim a swivel connector that will permit 360° rotation between the torch and the cable. However, the device has several limitations because of the various threaded connections and the possibility of internal arcing between several of the interfaces due to the lack of compressive forces at the interfaces. This structural arrangement will promote wear and unnecessary adherence to close manufacturing tolerances.

SUMMARY OF THE INVENTION

The present invention discloses a swivel cable coupling which permits 360° rotation between a cable, for which the coupling can be used, and a tool such as an air carbon-arc cutting and gouging torch. The apparatus of the instant invention utilizes the retainer portion of the coupling in combination with the insulating covering on the cable or the concentric cable to position a flat spring holder and associated flat spring washer a specific distance from the connector portion of the swivel coupling to provide optimal rotational resistance between the tool and the cable.

BRIEF DESCRIPTION OF THE DRAWINGS

FIG. 1 is a front elevational view partially in section and partially fragmentary of a concentric cable with a preferred embodiment of the swivel coupling according to the present invention.

FIG. 3 is a front elevational view in section of an alternate embodiment of the swivel coupling portion of the present invention.

DESCRIPTION OF THE PREFERRED EMBODIMENT

Figure 2:
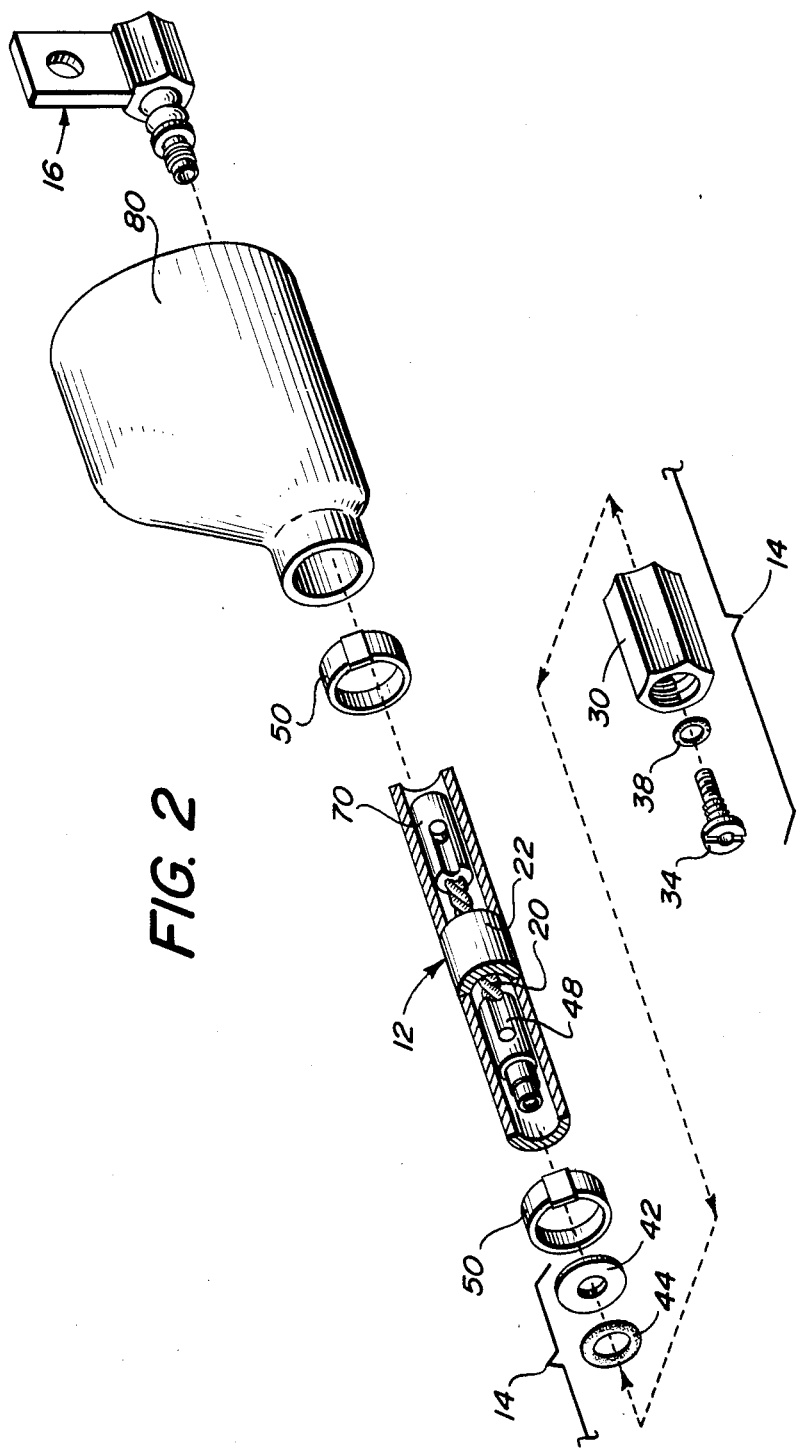
FIG. 2 is an isometric exploded view of the device of FIG. 1.

Referring to FIGS. 1 and 2, there is shown a swivel cable assembly 10 having a cable portion 12 a tool coupling end 14 and a supply end 16.

Cable 12 includes a central electrical conductor 20 preferrably made of a braided copper material which can carry heavy current densities. Surrounding electrical conductor 20 is an insulating conduit 22 held in spaced relation to the electrical conductor 20 (as will hereinafter be described) so that a gaseous fluid (e.g., Air) can be passed internally through the insulating conduit 22 from a source of supply (not shown) to the tool end 14 of cable assembly 10 as will hereinafter be more fully described.

On the tool end 14 there is a connector 30 in the form of a nut or other suitable shape for affixing to the projecting female end of a fitting in a torch (not shown). Connector nut 30 has an internal bore 32 and is suitably threaded to mate with the torch fitting not shown. The nut 30 is adapted to be mated to the fitting in a tool such as an air carbon-arc cutting and gouging torch as is shown and described in U.S. Pat. No. 3,573,419 the specification of which is incorporated herein by reference. In the case of a female adapter in the torch, a suitable female to male conversion adapter can be used. As is well known in the air carbon-arc cutting and gouging torch both electricity and air are conducted to the internal metallic portion of the torch by means of the concentric cable 10. Disposed within nut 30 is a retainer 34, the retainer having a bearing surface 36 which is complementary to a bearing surface in the nut 30. Retainer 34 includes a first groove to receive a sealing means such as an O ring 38 to provide a gas tight seal for the cable. A second annular slot 40 in retainer 34 is adapted to receive a flat hardened steel washer 42. Between washer 42 and the bottom of nut 30 a generally annular shaped spring washer 44, such as a washer spring sold under the trade designation SHAKEPROOF by the Illinois Tool Works, Inc., is included. The extreme projecting end of retainer 32 has an outside threaded portion 46 which is adpated to receive a complimentary threaded portion of the inside bore of knurled coupling 48. Retainer 44 includes a bore 47 passing through the entire member and communicating with a bore 49 in knurled coupling 48. The outer surface of knurled coupling 48 is roughened or knurled to receive insulating conduit 22 and to be fixed thereto by an annular clamp such as sold under the trade designation BAND-IT JR 2 sold by the Houdallie Industries, Inc. The knurled coupling 48 includes a cross passage 52 which communicates with the interior portion of insulating conduit 22 when it is installed on the knurled coupling as shown in the drawing. The terminal end of the knurled coupling 48 contains a counter bore 54 which receives one end of electrical conductor 20. Electrical conductor 20 is fixed to knurled coupling 48 by a lateral crimp thus the knurled coupling 48 is preferably made of a soft conductive material such as copper. When the cable is assembled to the tool end assembly 14 and the insulating conduit 22 is caused to bear against the washer 42 and the retainer 44 is seated in nut 30 the space between the end of the nut 30 and the face of the washer is fixed. With the help of the washer spring 44 there is thus created a frictional rotation between the retainer 34 and the nut 30 to maintain intimate contact of the nut 30 and retainer 34 along surface 36 to maximize current flow with little or no arcing at the interface.

On the supply end 16 of the cable there is included a metallic adapter 60 which includes a flat plate 62 with a aperture 64 so that plate 62 can be fixed to a source of electrical current. A nut portion 64 containing a threaded bore 66 is adapted for mating to a source of working fluid such as compressed air. Adapter 60 includes a barbed connector 68 affixed to nut 64 so that the insulating conduit 22 can be fixed thereto as by a clamp 50 such as described above. A further knurled coupling 70 is threaded to a threaded projection on barbed connector 68 and crimped to electrical conductor 20 disposed in a suitable recess 72. Connector 70 includes a central bore and a cross passage 74 so that process fluid can be conducted through the nut into the adapter through passage 74 into the space between electrical conductor 20 and insulating conduit 22, through aperture 52 through bore 47, through nut 30, and into the air carbon-arc torch. Electrical energy is conducted from tab 62 through the nut 64, through the adapter 70, through the electrical conductor 20, through knurled connector 48 to retainer 44 to nut 30 and to the metallic portions of the air carbon-arc cutting and gouging torch.

On the supply end 16 an insulating boot 80 is included to protect the user from touching the metallic portions connected to the power supply.

As stated above the apparatus of FIG. 1 provides for a complete 360° rotation of the tool (air carbon-arc cutting and gouging torch) since the retainer 44 can rotate against the nut 30 thus having only two parts which are involved in rotation against each other thus minimizing wear and the possibility of galling between the parts and subsequent electrical arcing and destruction of the cable and/ or the torch. In the device of FIG. 1 the knurled coupling 48 is made of a soft copper to permit crimping of the electrical conductor 20. Retainer 44 is made of a hard but electrically conductive copper which bears against a hard and electrically conductive nut both of which can be made of half hard brass or like material. Hard washer 42 provides acceptable wear when rotated against the spring washer 44 and provides rotational resistance once the position of the tool has been selected by the operator.

As shown in FIG. 3 the retainer and knurled coupling and the flat washer can be made from a single piece of copper. The combined retainer is fastened to nut 30 by means of a coupling 92. The spring steel washer 44 is disposed between the flanged portion 94 of adapter 90 and a suitable recess 96 in nut 30'. The apparatus of FIG. 3 can result in some galling between the spring steel washer 44 and the coupling 90.

Cable assemblies according to the present invention are readily manufactured and overcome a significant problem of electrical arcing which could occur in devices of the prior art since if the mechanical connections are not in intimate contact a gap would produce an arc where electricity is conducted between the metallic pieces. The use of the spring washer in compression exerts a force which forces the conductive surfaces together thus preventing arcing.

Having thus described our invention what is desired to be secured by letters patent of the United States is set forth in the appended claims.

What is claimed is:

1. A swivel coupling comprising in combination:
   a connector having first means to fasten said swivel coupling to a tool and second means including a bearing surface to receive a retainer for rotation relative to said connector;
   a retainer having a bearing surface complementary to the bearing surface of said retainer disposed for rotation relative to and held by said connector, said retainer including means to position a cable coupling in relation to a but spaced apart from said connector;
   a resilient washer disposed between said connector and said means on said retainer;
   a cable coupling adapted to hold an elongated electrically insulated conduit and an elongated electrically conductive conductor disposed within said conduit in spaced relation whereby when said bearing surfaces of said connector and said retainer are assembled for functional rotation, said resilient washer is positioned and said cable coupling is fixed to said retainer said retainer and said connector can rotate relative to one another without separation of the bearing surfaces; and
   means to fasten said conduit and said conductor to said coupling.

2. A swivel coupling according to claim 1 where said means to position said coupling includes a washer mounted on said connector and said resilient washer is a generally annular shaped spring washer disposed between said washer and said connector.

3. A swivel coupling according to claim 1 wherein said retainer and said cable coupling have internal passages to permit a gaseous fluid to flow from the interior of said conduit into said connector.

4. A swivel coupling according to claim 1 wherein said means to fasten said conduit to said coupling includes a band type clamp.

5. A swivel coupling according to claim 1 wherein said means to fasten said conductor to said coupling includes a bore in said coupling to receive an end of said conductor and a crimp in the outside surface of said coupling to fasten said conductor thereto.

6. A swivel coupling according to claim 1 wherein said conduit and said conductor are of unequal length terminating at a supply connector adapted to direct a gaseous fluid between said conductor and said conduit and electrical current through said conductor.

7. A swivel coupling comprising in combination:
   a hollow connector having a first end and second end, said first end having means to mount said connector to an apparatus such as an air carbon-arc cutting and gouging torch, said second end having means including a bearing surface in its interior portion to receive for rotation, a retainer;
   a retainer disposed within and projecting through the second end of said hollow connector said retainer including means having a bearing surface complimentary to the bearing surface of said retainer means to position a cable coupling in relation to but spaced apart from the second end of said hollow connector while maintaining a fluid tight relation between said retainer and said connector;
   a resilient washer disposed between said connector and said means on said retainer;
   a cable coupling adapted to hold an elongated electrically insulated conduit and an elongated electrically conductive conductor disposed within said conduit in spaced relation whereby when said bearing surfaces of said connector and said retainer are assembled for functional rotation, said washer is positioned and said cable coupling is fixed to said retainer said retainer and said connector can rotate relative to one another without separation of the bearing surfaces; and means to fasten said conduit and said conductor to said coupling.

8. A swivel coupling according to claim 7 wherein said means to position said coupling includes a washer mounted on said connector and said resilient washer is a generally annular shaped spring washer disposed between said washer and the second end of said connector.

9. A swivel coupling according to claim 7 wherein said retainer and said cable coupling have internal passages to permit a gaseous fluid to flow from the interior of said conduit into said connector.

10. A swivel coupling according to claim 1 wherein said conduit and said conductor are of unequal length terminating at a supply connector adapted to direct a gaseous fluid between said conductor and said conduit and electrical current through said conductor.

* * * * *